US012626499B2

(12) United States Patent
Murakami

(10) Patent No.: US 12,626,499 B2
(45) Date of Patent: May 12, 2026

(54) IMAGE PROCESSING DEVICE AND IMAGE PROCESSING METHOD

(71) Applicant: RENESAS ELECTRONICS CORPORATION, Tokyo (JP)

(72) Inventor: Tomochika Murakami, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 281 days.

(21) Appl. No.: 18/480,082

(22) Filed: Oct. 3, 2023

(65) Prior Publication Data

US 2024/0161493 A1 May 16, 2024

(30) Foreign Application Priority Data

Nov. 16, 2022 (JP) ................................ 2022-183153

(51) Int. Cl.
*G06V 10/94* (2022.01)
*G06T 1/60* (2006.01)
(Continued)

(52) U.S. Cl.
CPC .............. *G06V 10/955* (2022.01); *G06T 1/60* (2013.01); *G06V 10/7715* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 10,996,877 B2 * | 5/2021 | Sasamoto | .............. | G06V 10/95 |
| 2018/0189238 A1 * | 7/2018 | Lau | ........................ | G06N 3/084 |

(Continued)

FOREIGN PATENT DOCUMENTS

| | | | |
|---|---|---|---|
| JP | 2019-207458 A | 12/2019 | |

OTHER PUBLICATIONS

Zhao et al., "Random Shifting for CNN: a Solution to Reduce Information Loss in Down-Sampling Layers," IJCAI'17: Proceedings of the 26th International Joint Conference on Artificial Intelligence pp. 3476-34 (Year: 2017).*

*Primary Examiner* — Soo Shin
(74) *Attorney, Agent, or Firm* — Rimon P.C.

(57) ABSTRACT

An image processing device includes: a reception circuit receiving image data spread in a height direction and in a horizontal direction; a line memory having a register group for each channel, the resister group being capable of holding data spread in the horizontal direction in units of row along the height direction; a shift data generation circuit generating a plurality of pieces of first intermediate data in which spatial positions including the height direction of the image data are shifted by different shift amounts, and storing them in a plurality of register groups mutually corresponding to a plurality of channels of the line memory; a filtering processing circuit extracting, in the plurality of pieces of first intermediate data, data indicating the maximum value among a plurality of pieces of data having the same spatial position and having different channels; and a pooling processing circuit extracting, in second intermediate data indicating the maximum value among the plurality of pieces of data for each predetermined spatial region, and generating output data.

14 Claims, 10 Drawing Sheets

(51) Int. Cl.
*G06V 10/77* (2022.01)
*G06V 10/82* (2022.01)

(56) References Cited

U.S. PATENT DOCUMENTS

| | | | | |
|---|---|---|---|---|
| 2018/0315153 | A1* | 11/2018 | Park | G06N 3/045 |
| 2021/0263849 | A1* | 8/2021 | Zheng | G06F 9/30134 |
| 2021/0303909 | A1* | 9/2021 | Gunnam | G06V 10/764 |
| 2022/0019408 | A1* | 1/2022 | Kim | G06N 3/063 |
| 2022/0138527 | A1* | 5/2022 | Chabanne | G06N 3/094 706/26 |
| 2022/0331841 | A1* | 10/2022 | Filler | G06K 7/1482 |
| 2023/0004350 | A1* | 1/2023 | Li | G06N 3/0464 |
| 2023/0115373 | A1* | 4/2023 | Badaroglu | G06N 3/0464 708/670 |
| 2024/0071573 | A1* | 2/2024 | Jaganathan | G06N 3/08 |

* cited by examiner

Max Filtering (2) + Max Pooling (2,2)

Max Pooling (3x3, 2x2) -> Max Filtering (2x2) + Max Pooling (2x2, 2x2)

kernel=(1, 3), stride = Example of Kernel of (1, 1)

Max Filtering (2) + Max Pooling (2, 2)

IMAGE PROCESSING DEVICE AND IMAGE PROCESSING METHOD

CROSS-REFERENCE TO RELATED APPLICATION

The present application claims priority from Japanese Patent Application No. 2022-183153 filed on Nov. 16, 2022, the content of which is hereby incorporated by reference into this application.

BACKGROUND

The present disclosure relates to an image processing device and an image processing method and to an image processing device and an image processing method suitable for efficiently performing an image processing without increasing a circuit scale.

In recent years, with dramatic improvement in a recognition rate of an image recognition processing using a Convolutional Neural Network (CNN), automobile manufacturers around the world are competing to develop an Advanced Driver-Assistance Systems (ADAS) using the CNN and automatic driving technology. Under such circumstances, semiconductor manufacturers that supply image recognition processors and the like to the automobile manufacturers are required to further improve performance of image recognition processing using the CNN.

There is a disclosed technique listed below.

[Patent Document 1] Japanese Unexamined Patent Application Publication No. 2019-207458

For example, Patent Document 1 discloses a technique for speeding up CNN-Intellectual Property (IP).

SUMMARY

By the way, since the CNN-IP disclosed in Patent Document 1 does not support an Overlap Pooling processing, the Overlap Pooling processing requires to be assigned to, for example, an IP, which is capable of performing another Overlap Pooling processing (for example, a programmable processor Computer Vision engine (CVe) capable of various processing) and is different from the CNN-IP. Incidentally, the Overlap Pooling processing is a max pooling processing in which a kernel size is larger than a stride. In using the Overlap Pooling processing in a neural network, it is said that there is effective in preventing over-learning and enhancing a recognition rate of recognition objects. The Overlap Pooling processing is also used in prominent and well-known neural networks such as ResNet50. However, since programmable processors such as CVe are general-purpose, their processing performance is lower than that of the CNN-IP specialized for specific processing. In addition, switching allocation of the processing from a CNN-IP to another IP takes time to implement including system support containing data transfer between the two IPs.

In order to solve the above-mentioned problems, it is strongly desired that the CNN-IP be configured to be able to perform the Overlap Pooling processing. However, in order for the CNN-IP to be configured to be able to perform the Overlap Pooling processing, it is necessary to additionally provide a buffer (register) for the overlap in the CNN-IP, which brings a problem in which the circuit scale of the CNN-IP is increased.

The other problems and novel features will be apparent from the present specification and accompanying drawings.

According to one embodiment, an image processing device includes: a reception circuit receiving image data spread in a height direction and a horizontal direction; a line memory having a register group for each channel, the resister group being capable of holding data spread in the horizontal direction in units of row along the height direction; a shift data generation circuit generating a plurality of pieces of first intermediate data in which a spatial position including the height direction of the image data is shifted by a different shift amount, the shift data generation circuit storing them in a plurality of register groups respectively corresponding to the plurality of channels of the line memory; a filtering processing circuit extracting data, which indicates a maximum value among the plurality of pieces of data having the same spatial position and having a different channel, from the plurality of pieces first intermediate data stored in the line memory, and generating second intermediate data; and a pooling processing circuit extracting, from the second intermediate data, data indicating the maximum value among the plurality of pieces of data for each predetermined spatial region, and generating output data.

According to one embodiment, an image processing device includes: a line memory having a resister group for each channel, the resister group capable of holding data spread in a horizontal direction in units of row along a height direction; a reception circuit receiving a plurality of pieces of first intermediate data in which a spatial position including a height direction of image data spread in the height direction and in the horizontal direction is shifted by a different shift amount, the reception circuit storing them in a plurality of resister groups respectively corresponding to a plurality of channels of the line memory; a filtering processing circuit extracting data, which indicates a maximum value among a plurality of data having a same spatial position and having different channels, from the plurality of pieces of first intermediate data stored in the line memory, the filtering processing circuit generating second intermediate data; and a pooling processing circuit extracting, from the second intermediate data, data indicating the maximum value among the plurality of pieces of data for each predetermined spatial region, and generating output data.

According to one embodiment, an image processing method having a reception circuit receiving image data spread in a height direction and in a horizontal direction, a line memory having, for each channel, a resister group capable of holding data spread in the horizontal direction in units of row along a height direction, a shift data generation circuit, a filtering processing circuit, and a polling processing circuit, the method includes: receiving the image data by the reception circuit; generating a plurality of pieces of intermediate data, in which spatial positions including the height direction of the image data are shifted by different shift amounts, by the shift data generation circuit; storing the plurality of pieces of first intermediate data in a plurality of register groups mutually corresponding to a plurality of channels of the line memory, respectively; extracting, by the filtering processing circuit, data indicating a maximum value among a plurality of pieces of data, which have a same spatial position and have a different channel, among the plurality of pieces of first intermediate data stored in the plurality of resister groups of the line memory, and generating second intermediate data; and extracting, by the pooling processing circuit, data indicating the maximum value among the plurality of pieces data for each predetermined spatial region, and generating output data.

The present disclosure can provide an image processing device and an image processing method, which are capable of efficiently performing an image processing without increasing a circuit scale.

DETAILED DESCRIPTION

Figure 1:
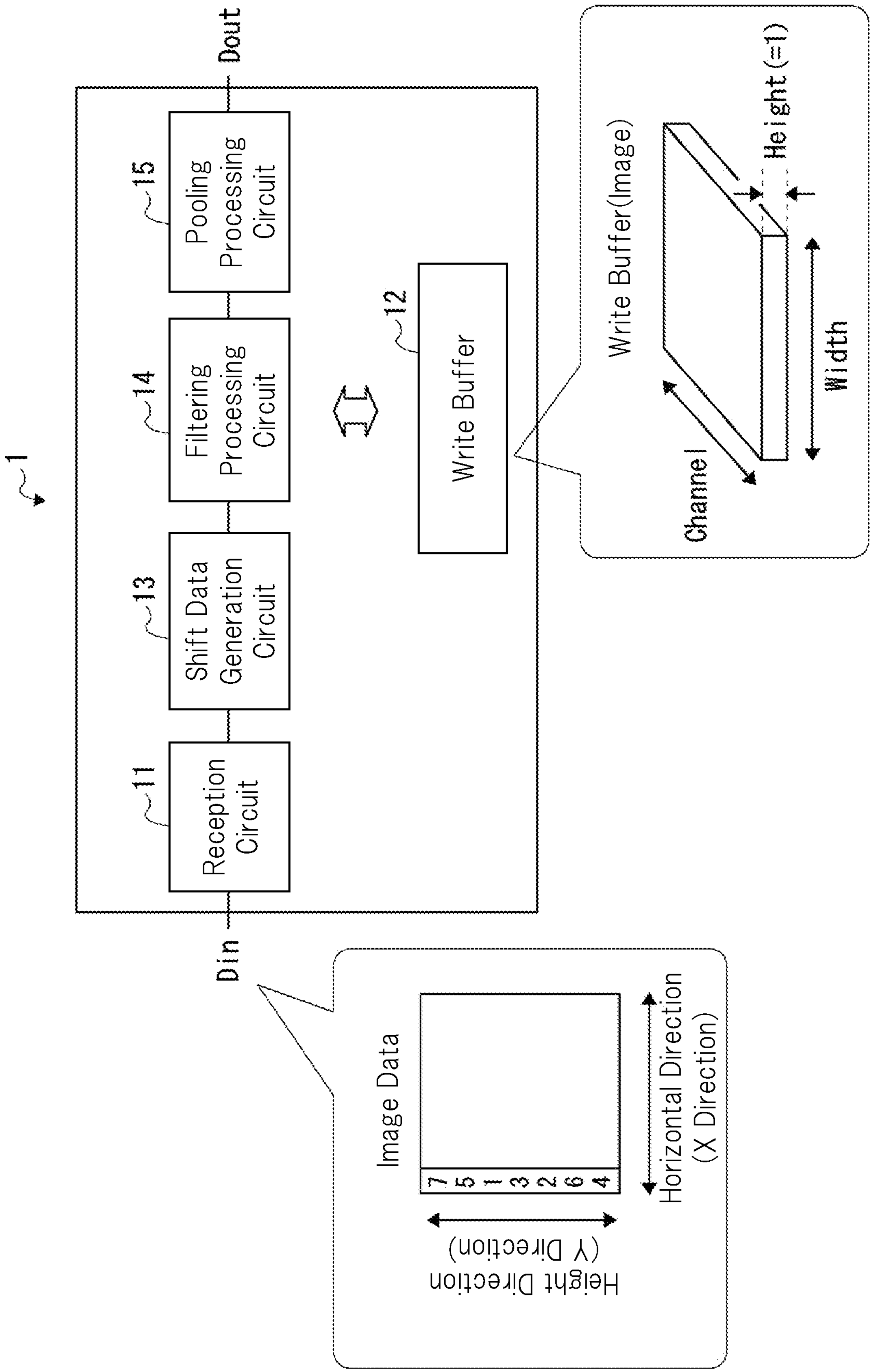
FIG. 1 is a block diagram showing a configuration example of an image processing device according to a first embodiment.

Hereinafter, embodiments will be described with reference to the drawings. Incidentally, since the drawings are simplified, the technical scope of the embodiments should not be narrowly interpreted on the basis of the description of the drawings. Also, the same elements are denoted by the same reference numerals, and an overlapping description thereof will be omitted.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above (including numbers, numerical values, amounts, ranges, etc.).

FIRST EMBODIMENT

FIG. 1 is a block diagram showing a configuration example of an image processing device 1 according to the first embodiment. The image processing device 1 according to the present embodiment is a so-called CNN accelerator that performs Max Pooling processing of image data. Here, the image processing device 1 according to the present embodiment stores data in a height direction of image data along a channel direction of a line memory (write buffer), and extracts data indicating the maximum value among a plurality of channels. Consequently, the image processing device 1 according to the present embodiment can perform an Overlap Pooling processing, which is one of the max pooling processing, without adding a line memory buffer (register). That is, the image processing device 1 according to the present embodiment can efficiently perform image processing without increasing the circuit scale. A specific description will be given below.

As shown in FIG. 1, the image processing device 1 includes at least a reception circuit 11, a write buffer 12 configured by a line memory, a shift data generation circuit 13, a filtering processing circuit 14, and a pooling processing circuit 15.

The reception circuit 11 receives image data (input data) Din inputted from an outside. The image data Din is data composed of a plurality of pixels spread over spatial regions in a horizontal direction (X direction) and the height direction (Y direction). In other words, the image data Din is data composed of the plurality of pixels, which are arranged in a matrix, in the spatial regions in the horizontal direction and the height direction. Incidentally, the image data Din may be composed of image data of a plurality of channels. For example, if the image data Din is RGB data, it is composed of image data of at least three channels corresponding to respective colors of red, green, and blue.

In the present embodiment, the image processing device 1 reads the image data Din into a read buffer (not shown), writes the shift data, which is generated by the processing of the shift data generation circuit 13, to the write buffer 12, and performs the Overlap Pooling processing on the write buffer 12. Here, the image processing device 1 divides the Overlap Pooling processing into two processing of a Max Filtering processing and a Max Pooling processing. Incidentally, the Max Filtering processing is a processing of extracting data indicating the maximum value among the data within a range of the kernel for each pixel, and is substantially the same processing as the Max Pooling processing whose stride is 1. Specifically, the Overlap Pooling processing is divided into two processing of the Max Filtering processing and the Max Pooling processing as shown in Equation (1) below.

$$\text{Max Pooling }(K,S) \Rightarrow \text{Max Filtering }(K-S+1)+\text{Max Pooling }(S,S) \quad (1)$$

Here, the Max Pooling (K, S) represents an Overlap Pooling processing as a Max Pooling processing whose kernel size is K (K is a positive integer) and whose stride is S (K>S and S is a positive integer). The Max Filtering (K−S+1) represents a Max Filtering processing whose kernel size is KS+1. Incidentally, a processing result of the Max Filtering (K−S+1) is the same as a processing result of the Max Pooling (K−S+1, 1). Furthermore, Max Pooling (S, S) represents a Max Pooling processing whose both kernel size and stride are S.

Figure 2:
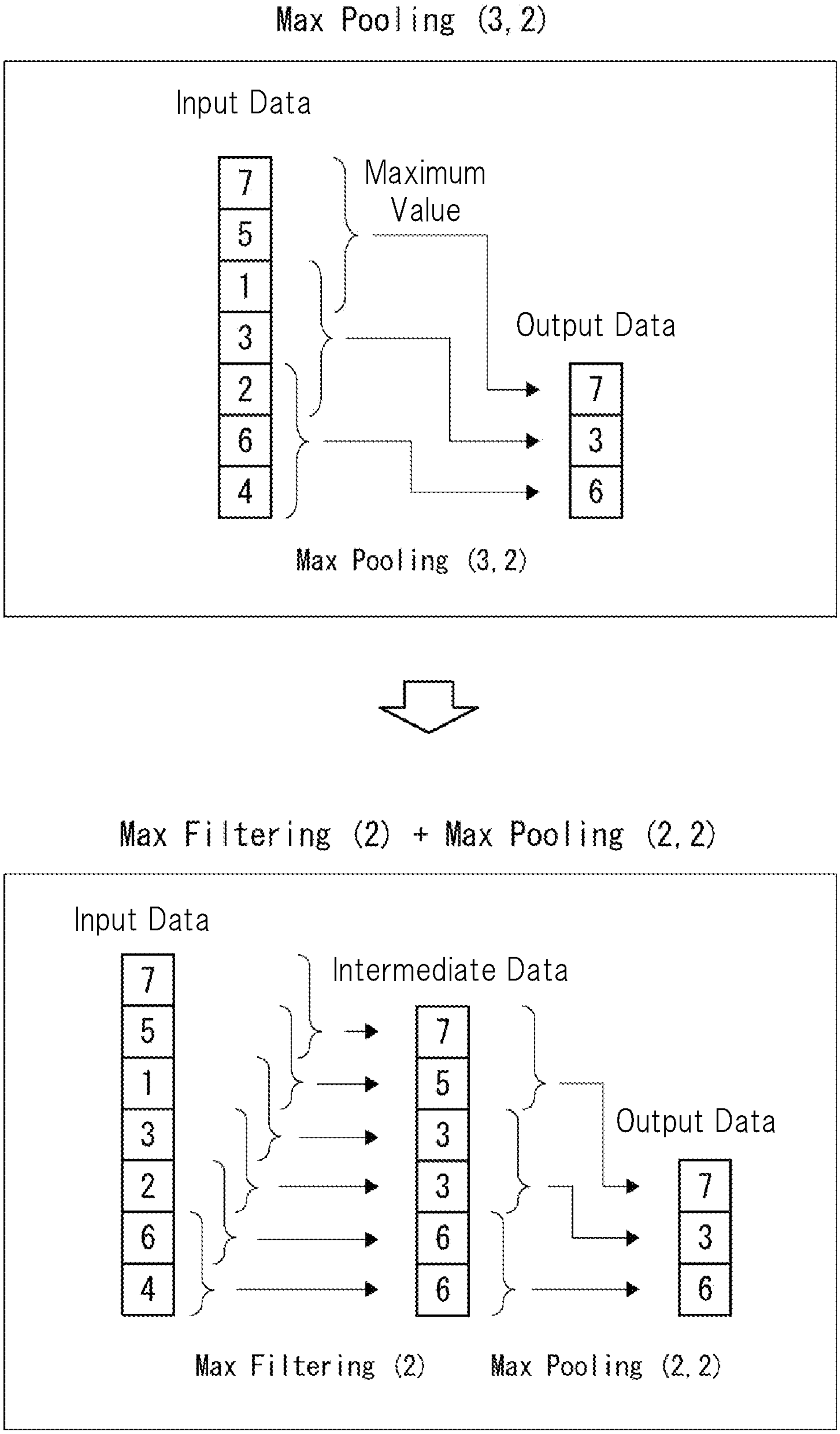
FIG. 2 is a diagram for explaining an overview of an Overlap Pooling processing by the image processing device according to the first embodiment.

FIG. 2 is a diagram for explaining an overview of the Overlap Pooling processing by the image processing device 1. Incidentally, FIG. 2 also shows a flow of an Overlap Pooling processing, which is not divided into the two processing of the Max Filtering processing and the Max Pooling processing.

In an example of FIG. 2, for simplification of explanation, performed are the Overlap Pooling processing on the data of the plurality of pixels spread in the height direction after the processing by the shift data generation circuit 13 is performed on the image data Din. Specifically, in the example of FIG. 2, the Overlap Pooling processing whose kernel size is 3 and whose stride is 2 is performed on the image data (input data) containing seven pixels that have numeral values of 4, 6, 2, 3, 1, 5, and 7 spread in the height direction.

First, in the image data containing the seven pixels having the numeral values of 4, 6, 2, 3, 1, 5, and 7 spread in the height direction for the Overlap Pooling processing that is not divided into the two processing of the Max Filtering processing and the Max Pooling processing, pixel data having the maximum value of 6 is extracted from three consecutive pieces of pixel data with the numerical values of 4, 6, and 2, and pixel data having the maximum value of 3 is extracted from the three consecutive pieces of pixel data with the numerical values of 2, 3, and 1, and pixel data having the maximum value of 7 is extracted from the three consecutive pieces of pixel data with the numerical values 1, 5, and 7. The extracted three pieces of pixel data with the numerical values 6, 3, and 7 are outputted as image data (output data) Dout in which resolution is lowered while retaining a feature amount of image data.

By contrast, the Overlap Pooling processing by the image processing device 1 is specifically divided into two processing of a Max Filtering processing and a Max Pooling processing as shown in Equation (2) below.

Max Pooling (3,2)=>Max Filtering (2)+Max Pooling (2,2) (2)

First, for image data (input data) containing seven pieces of pixels with numerical values of 4, 6, 2, 3, 1, 5, and 7 spread in the height direction in a processing of Max Filtering (2), a processing substantially equivalent to the Max Pooling processing whose kernel size is 2 and whose stride is 1 is performed. That is, in the Max Filtering processing, pixel data having the maximum value of 6 is extracted from two consecutive pieces of pixel data with numerical values of 4 and 6, pixel data having the maximum value of 6 is extracted from two consecutive pieces of pixel data with numerical values of 6 and 2, pixel data having the maximum value of 3 is extracted from two consecutive pieces of pixel data with numerical values 2 and 3, pixel data having the maximum value of 3 is extracted from two consecutive pieces of pixel data with the numerical values of 3 and 1, pixel data having the maximum value of 5 is extracted from two consecutive pieces of pixel data with numerical values 1 and 5, and pixel data having the maximum value of 7 is extracted from two consecutive pieces of pixel data with numerical values of 5 and 7. These six pieces of pixel data having the numerical values of 6, 6, 3, 3, 5, and 7 are extracted as intermediate data.

Thereafter, for the intermediate data containing six pieces of pixels having the numerical values of 6, 6, 3, 3, 5, and 7 spread in the height direction in the processing of the Max Pooling (2, 2), the pixel data having the maximum value of 6 is extracted from the two consecutive pieces of pixel data with the numerical values 6 and 6, the pixel data having the maximum value of 6 is extracted from the two consecutive pieces of pixel data with the maximum value of 3 is extracted from the two consecutive pixel data with the numerical values of 3 and 3, and the pixel data having the maximum value of 3 is extracted from the two consecutive pieces of pixel data with the numerical values of 5 and 7. The extracted three pieces of pixel data with the numerical values of 6, 3, and 7 are outputted as image data (output data) Dout in which resolution is lowered while retaining a feature amount of image data.

Returning to FIG. 1, the above explanation will be continued. The write buffer 12 has, for each channel, a register group composed of a plurality of registers linearly formed. In other words, the write buffer 12 has, for each channel, a register group composed of one row in the height direction and a plurality of registers in a horizontal direction. Therefore, the write buffer 12 can hold horizontally spread data in units of one row along the height direction among the shift data generated by performing the processing of the shift data generation circuit 13 on the image data Din. Incidentally, each register of the write buffer 12 is composed of, for example, a flip-flop so that high-speed data reading and writing can be realized.

Here, since the CNN-IP of the related technology disclosed in Patent Document 1 does not support the Overlap Pooling processing, the Overlap Pooling processing is assigned to an IP such as CVe that is different from the CNN-IP of the related technology, for example. However, since programmable processors such as CVe are general-purpose, their processing performance is lower than that of CNN-IP specialized for specific processing. In addition, switching the processing assignment from the related technology CNN-IP to another IP takes time to implement, including system support including data transfer between the two IPs.

In contrast, if additional buffers (registers) for the overlap are provided for the write buffer so that the CNN-IP of related technology can perform the Overlap Pooling processing, the circuit scale may increase. In regions where a plurality of kernels taking the maximum value overlap, not only the maximum value of each pixel but also an original value for computing the plurality of kernels next taking the maximum value need to be simultaneously retained and to have the plurality of buffers.

Therefore, the image processing device 1 stores data in the height direction of the image data along the channel direction of the write buffer 12, thereby making addition of the buffers (registers) for the overlap unnecessary. Since the registers have larger logic circuits than SRAMs (Static Random Access Memories), making the buffers for the overlap unnecessary has the effect of preventing an increase in chip area and, concomitantly, also has the effect of preventing an increase in power consumption. Details of the Overlap Pooling processing by the image processing device 1 will be described later together with a description of other circuits.

Figure 3:
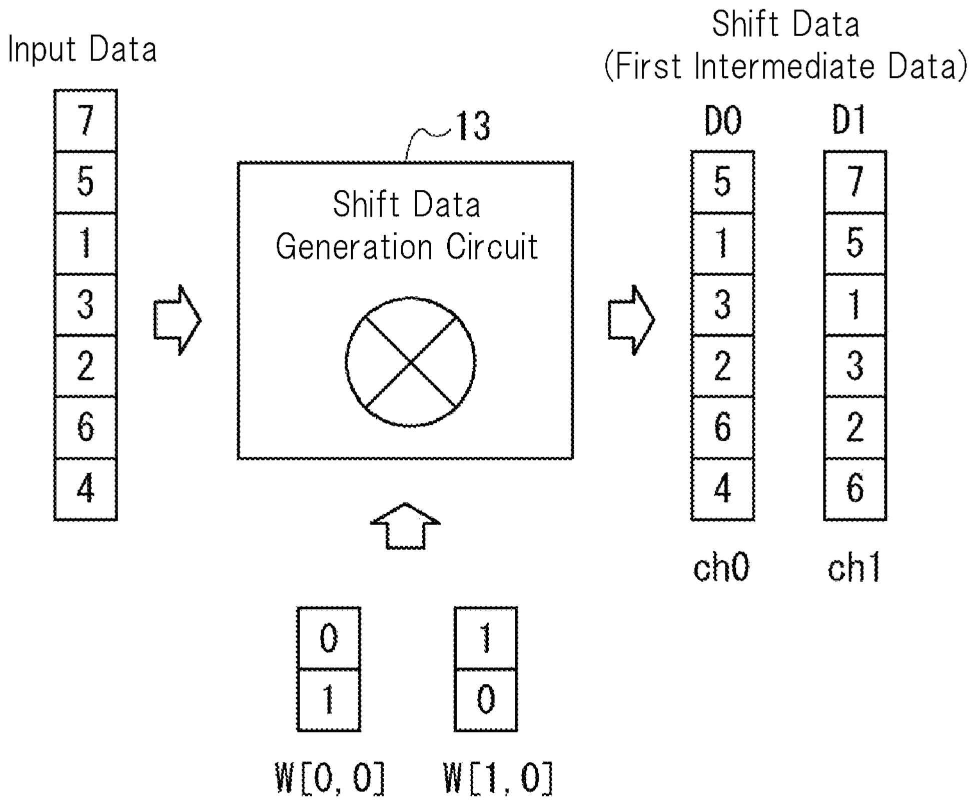
FIG. 3 is a diagram showing one example of a shift data generation processing by a shift data generation circuit provided in the image processing device according to the first embodiment.

The shift data generation circuit 13 generates a plurality of pieces of shift data (first intermediate data) in which data in the height direction of the image data Din is shifted by different shift amounts. Incidentally, the shift data generation circuit 13 may be implemented by using a function of a convolution operation circuit mounted in a general CNN accelerator. The plurality of pieces of shift data generated by the shift data generation circuit 13 are stored in a plurality of mutually corresponding register groups of the plurality of channels of the write buffer 12, respectively. FIG. 3 is a diagram showing one example of a shift data generation processing by the shift data generation circuit 13. Referring to FIG. 3, the shift data generation circuit 13 multiplies each of kernels W[0,0] and W[1,0], whose shift amounts in the height direction are different, by the pixel data (input data) containing seven pixels with numeral values of 4, 6, 2, 3, 1, 5, and 7 spread in the height direction, thereby generating shift data D0 containing six pixels with numerical values of 4, 6, 2, 3, 1, and 5 and shift data D1 containing six pixels with numerical values of 6, 2, 3, 1, 5, and 7. The shift data D1 is shifted by one pixel in the height direction in comparison to the shift data D0. The shift data DO is stored in the register of a channel ch0 of the write buffer 12, and the shift data D1 is stored in a register corresponding to the register of the channel ch0, in which the shift data D0 is stored, among the register group of the channel ch1 of the write buffer 12. More specifically, the shift data D1 is stored in a register in the same spatial area (same address value) as that of the register of the channel ch0, in which the shift data D0 is stored, among the register group of the channel ch1 of the write buffer 12. That is, the data in the height direction of the image data Din is stored along the channel direction of the write buffer 12 in kernel size units of the Max Filtering.

The filtering processing circuit 14 is a circuit that performs a Max Filtering processing among two types of processing of a Max Filtering processing and a Max Pooling processing for realizing the Overlap Pooling processing. Specifically, the filtering processing circuit 14 extracts, from the plurality of pieces of shift data stored in the write buffer 12, data indicating the maximum value among the plurality of pieces of data having the same spatial position (offset value from a top address in channel units) and different channels, and generates intermediate data (second intermediate data). Incidentally, the filtering processing circuit 14 may be implemented by using a Max out function, which is a maximum value acquisition function in the plurality of channels, in a circuit that performs data processing in the channel direction along the same pixel position existing in the CNN-IPs, namely, a Cross Channel Operation circuit.

The pooling processing circuit 15 is a circuit that performs the Max Pooling processing among the two types of processing, that is, the Max Filtering processing and the Max Pooling processing for realizing the Overlap Pooling processing. Specifically, the pooling processing circuit 15 extracts, from the intermediate data (second intermediate data) generated by the filtering processing circuit 14, the data indicating the maximum data among the plurality of pieces of data for each kernel size (predetermined space area) the Max pooling, and generates the image data (output data) Dout.

Figure 4:
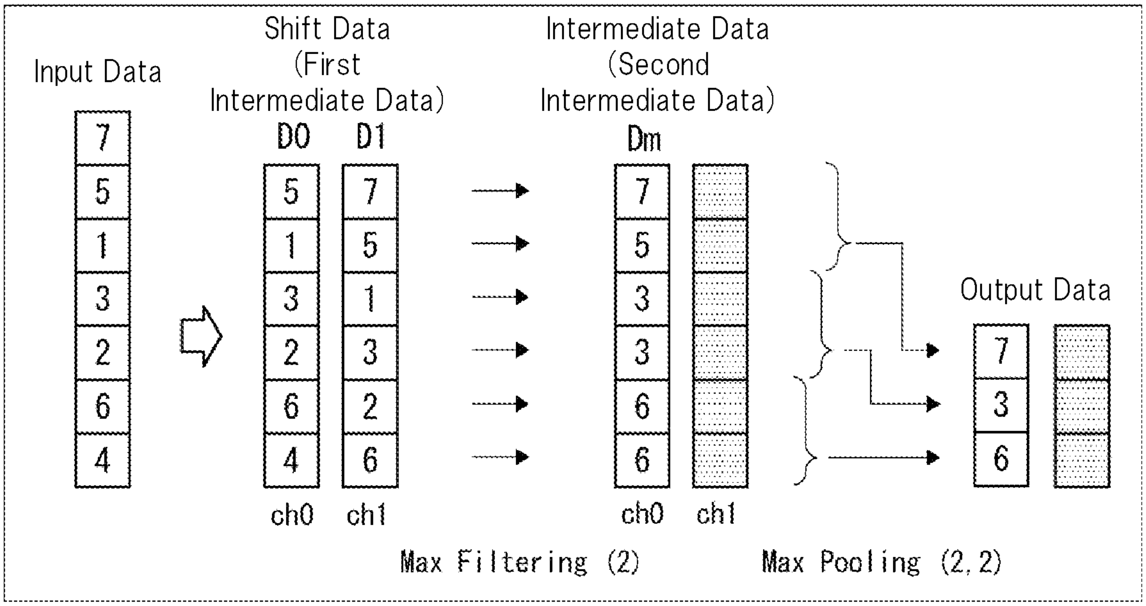
FIG. 4 is a diagram showing one example of the Overlap Pooling processing by the image processing device according to the first embodiment.

FIG. 4 is a diagram showing one example of the Overlap Pooling processing by the image processing device 1. In an example of FIG. 4, the filtering processing circuit 14 performs a Max Filtering processing whose kernel size is 2 (that is, a processing of Max Filtering (2)), and the pooling processing circuit 15 performs a Max filtering whose kernel size and stride are 2 (that is, a processing of Max Pooling (2, 2). As shown in FIG. 4, first, the filtering processing circuit 14 extracts, as the processing of Max Filtering (2) from the shift data D0, D1, the data indicating the maximum value out of the two pieces of data having the same spatial position (offset value from a head address in units of channel), and generates intermediate data Dm.

Specifically, the filtering processing circuit 14 first extracts the pixel data having the maximum value of 6 out of the pixel data with a numerical value of 4 in the shift data DO and the pixel data with a numerical value of 6 in the shift data D1. Next, the filtering processing circuit 14 extracts the pixel data having the maximum value of 6 out of the pixel data with a numerical value of 6 in the shift data D0 and the pixel data with a numerical value of 2 in the shift data D1. Next, the filtering processing circuit 14 extracts the pixel data having the maximum value of 3 out of the pixel data with a numerical value of 2 in the shift data D0 and the pixel data with a numerical value of 3 in the shift data D1. Next, the filtering processing circuit 14 extracts the pixel data having the maximum value of 3 out of the pixel data with a numerical value of 3 in the shift data D0 and the pixel data with a numerical value of 1 in the shift data D1. Next, the filtering processing circuit 14 extracts the pixel data having the maximum value of 5 out of the pixel data with a numerical value of 1 in the shift data D0 and the pixel data with a numerical value of 5 in the shift data D1. Next, the filtering processing circuit 14 extracts the pixel data having the maximum value of 7 out of the pixel data with a numerical value of 5 in the shift data D0 and the pixel data with a numerical value of 7 in the shift data D1. The extracted six pieces of pixel data of numerical values of 6, 6, 3, 3, 5, and 7 are stored as intermediate data Dm in the register of the channel ch0 of the write buffer 12, for example.

Thereafter, the pooling processing circuit 15 extracts, as the processing of Max Pooling (2, 2), the data indicating the maximum value for each of two pieces of pixel data corresponding to the kernel size of the Max Pooling (2, 2) from the intermediate data Dm, and generates image data (output data) Dout.

Specifically, the pooling processing circuit 15 first extracts, in the intermediate data Dm including six pixels of numerical values 6, 6, 3, 3, 5, and 7, the pixel data having the maximum value of 6 out of the two consecutive pieces of pixel data with numerical values of 6 and 6, extracts the pixel data having the maximum value of 3 out of the two consecutive pieces of pixel data with numerical values of 3 and 3, and extracts the pixel data having the maximum value of 3 out of the two consecutive pieces of pixel data with numerical values of 5 and 7. The extracted three pieces of pixel data having numerical values 6, 3, and 7 are outputted as image data (output data) Dout whose resolution is lowered while retaining a feature amount of the input data Din.

In this way, the image processing device 1 according to the present embodiment stores the data in the height direction of the image data along the channel direction of the light buffer 12, and extracts the data indicating the maximum value among a plurality of channels. Consequently, the image processing device 1 according to the present embodiment can perform the Overlap Pooling processing, which is one of the Max Pooling processing, without adding buffers (registers) to the write buffer 12. That is, the image processing device 1 according to the present embodiment can efficiently perform the image processing without increasing the circuit scale.

Other Examples of Overlap Pooling Processing by Image Processing Device 1

Figure 5:
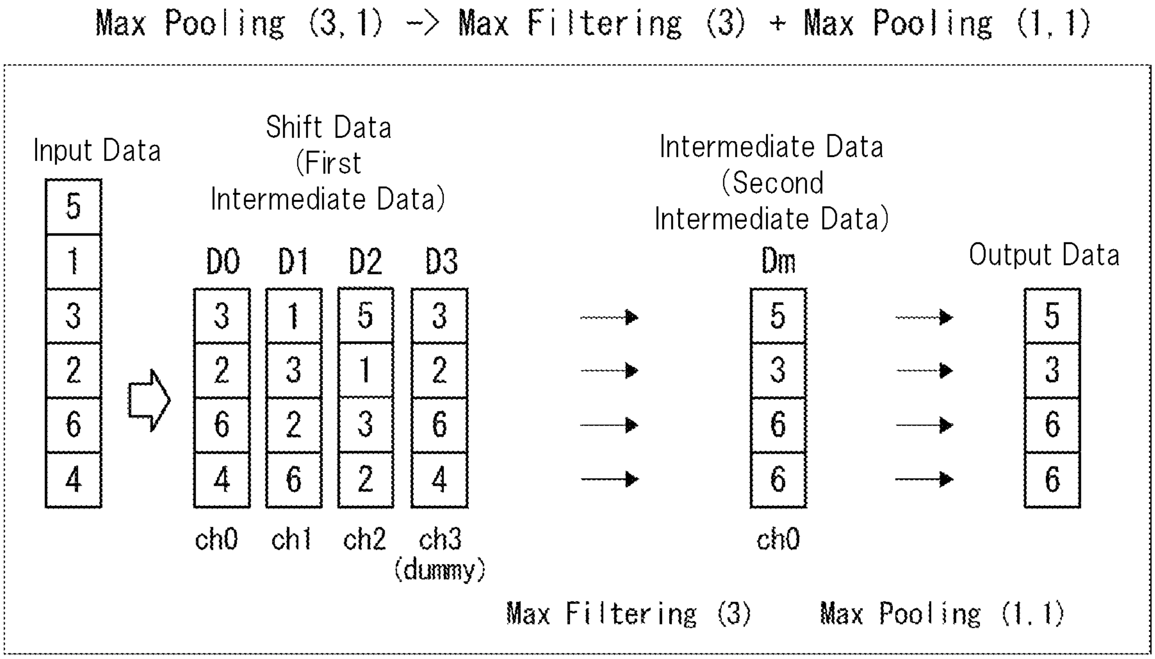
FIG. 5 is a diagram for explaining another example of the Overlap Pooling processing by the image processing device according to the first embodiment.

FIG. 5 is a diagram showing another example of the Overlap Pooling processing by the image processing device 1. In an example of FIG. 5, the Overlap Pooling processing whose kernel size is 3 and whose stride is 1 (that is, a processing of a Max Pooling (3, 1)) is divided into two processing of the Max Filtering processing whose kernel size is 3 (that is, a processing a Max Filtering (3)) and the Max Pooling processing whose kernel size and stride are both 1 (that is, a processing of a Max Pooling (1, 1)).

That is, in the example of FIG. 5, the filtering processing circuit 14 performs the processing of the Max Filtering (3), and the pooling processing circuit 15 performs the processing of the Max Pooling (1, 1).

As shown in FIG. 5, the shift data generation circuit 13 first generates a plurality of pieces of shift data (first intermediate data) in which the data in the height direction of the image data Din is shifted by different shift amounts. Specifically, the shift data generation circuit 13 generates four pieces (corresponding to kernel size "3"+dummy "1" of the Max Filtering (3)) of shift data D0 to D3 from the data in the height direction of the image data Din. The shift data D1 is shifted by one pixel in the height direction in comparison with the shift data D0. The shift data D2 is shifted by two pixels in the height direction in comparison with the shift data D0. The shift data D3 is dummy data and has the same value as that of the shift data D0. The shift data D0 to D3 generated from the data in the height direction of the image data Din are stored in the registers of the channels ch0 to ch3 of the write buffer 12, respectively. Incidentally, by providing the dummy data D3, the present embodiment has an advantage as follows: even if the subsequent filtering processing circuit 14 can obtain the maximum value in the channel direction only in units of four channels, data of the fourth channel can be filled so that calculation for obtaining the maximum value of the three channels is not affected.

Thereafter, as the processing of the Max Filtering (3), the filtering processing circuit 14 extracts the data indicating the maximum value out of the four pieces of pixel data having the same spatial position (offset value from a head address in units of channel) from the shift data D0 to D3, and generates intermediate data Dm. In the example of FIG. 5, the filtering processing circuit 14 extracts four pieces of pixel data with numerical values 6, 6, 3, and 5, and generates them as intermediate data Dm. This intermediate data Dm is stored in the register of a channel ch0 of the write buffer 12, for example.

Thereafter, the pooling processing circuit 15 extracts, as the processing of the Max Pooling (1, 1), the data, which indicates the maximum value for each piece of pixel data having a number corresponding to the kernel size of the Max Pooling (1, 1), from the intermediate data Dm, and generate image data (output data) Dout. However, in the example of FIG. 5, since the kernel size of the Max Pooling (1, 1) is 1, the processing by the pooling processing circuit 15 is not performed. That is, the intermediate data Dm is used, as it is, as the image data (output data) Dout.

Other Examples of Overlap Pooling Processing by Image Processing Device 1

Figure 6:
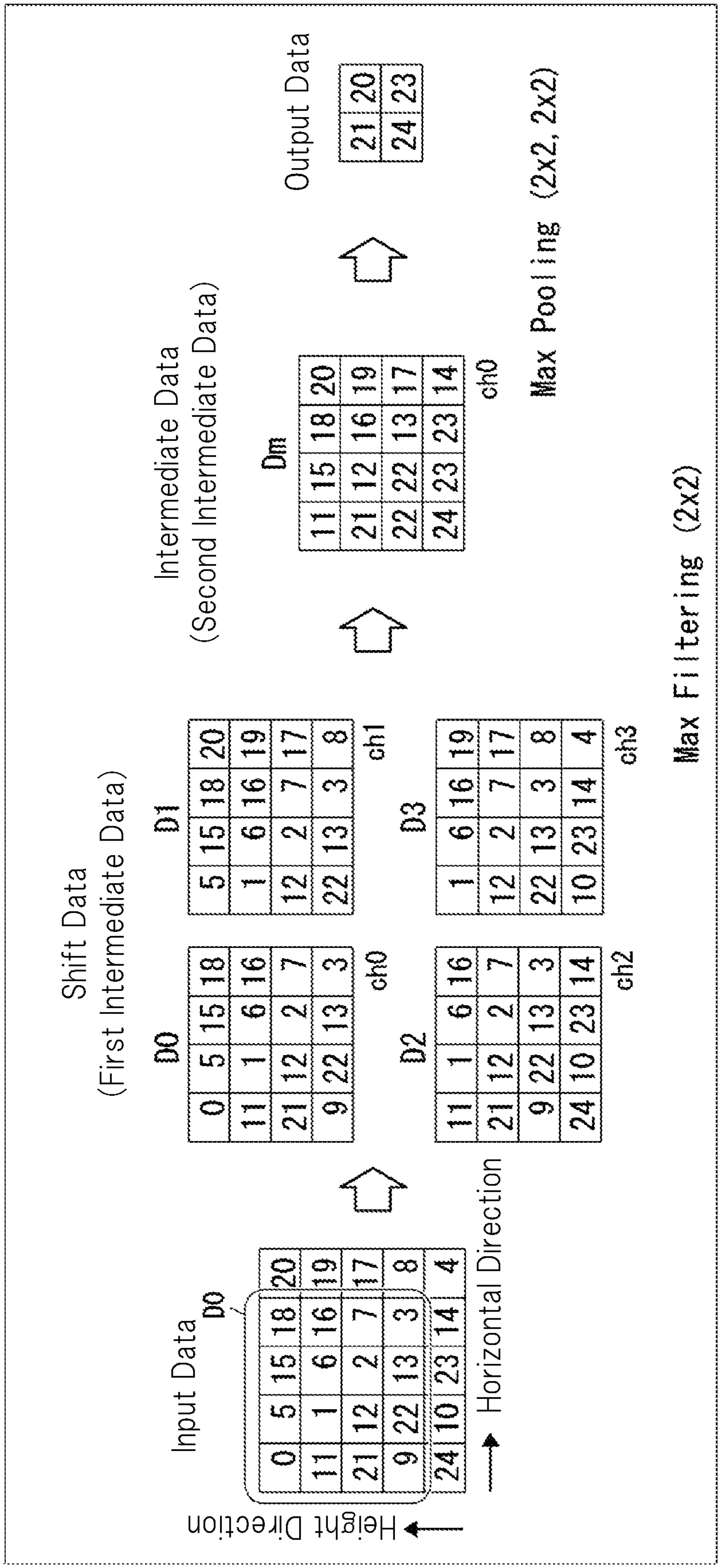
FIG. 6 is a diagram for explaining yet another example of the Overlap Pooling processing by the image processing device according to the first embodiment.

FIG. 6 is a diagram showing another example of an Overlap Pooling processing by the image processing device 1. In an example of FIG. 6, the image processing device 1 performs an Overlap Pooling processing on the image data Din spread in the horizontal direction and the height direction.

Also, in the example of FIG. 6, the Overlap Pooling processing whose kernel size is 3 in both the vertical and horizontal directions and whose stride is 2 in both the vertical and horizontal directions (that is, processing of Max Pooling processing of (3×3, 2×2)) is divided into two processing of the Max Filtering processing whose kernel size is 2 per direction (that is, processing of Max Filtering (2×2)) and the Max Pooling processing whose kernel size and stride are 2 per direction (that is, processing of Max Pooling (2×2, 2×2)). Here, the Max Pooling (3×3, 2×2) represents use of two-dimensional kernel of three pixels in the vertical direction and three pixels in the horizontal direction for the kernel, and using a 2-dimensional stride of two pixels in the vertical direction and two pixels in the horizontal direction for the stride. Similarly, the Max Filtering (2×2) represents use of a two-dimensional kernel of two pixels in the vertical direction and two pixels in the horizontal direction for the kernel.

Namely, in the example of FIG. 6, the filtering processing circuit 14 performs the processing of the Max Filtering (2) per direction of vertical or horizontal direction, that is, the processing of the Max Filtering (2×2), and the pooling processing circuit 15 performs the processing of the Max Pooling (2×2, 2×2) per direction of vertical or horizontal direction, that is, the processing of the Max Pooling (2×2, 2×2).

As shown in FIG. 6, the shift data generation circuit 13 first generates a plurality of pieces of shift data which the spatial position of the image data Din is shifted by a different shift amount (first intermediate data). Specifically, the shift data generation circuit 13 generates two pieces of shift data per direction (corresponding to kernel size "2" of Max Filtering (2)), that is, a total of four pieces of shift data D0 to D3 from the image data Din. The shift data D1 is shifted by one pixel in the horizontal direction in comparison with the shift data D0. The shift data D2 is shifted by one pixel in the height direction in comparison with the shift data D0. The shift data D3 is shifted by one pixel in the horizontal direction and by one pixel in the height direction in comparison with the shift data D0. The shift data D0 to D3 generated from the image data Din are stored in a register group of the channels ch0 to ch3 of the write buffer 12, respectively.

Thereafter, the filtering processing circuit 14 selects, as a processing of the Max Filtering (2) per direction, the data indicating the maximum value among the four pieces of pixel data, which have the same spatial position (offset value from head address in units of channel), from the shift data D0 to D3, and generates it as intermediate data Dm. This intermediate data Dm is stored in the register group of channel ch0 of the write buffer 12, for example.

Thereafter, the pooling processing circuit 15 extracts, as a processing of the Max Pooling (2, 2) per direction, the data indicating the maximum value for each piece of pixel data of 2 rows×2 columns, and generates the image data (output data) Dout.

SECOND EMBODIMENT

In the image processing device 1 according to the first embodiment, the shift data generation circuit 13 has generated the plurality of pieces of shift data by multiplying the image data Din by the plurality of kernels that are inputted from the outside and have different shift amounts. In contrast, in the image processing device according to the present embodiment, the plurality of kernels with different shift amounts are stored in advance in the registers within the image processing device, and the desired kernel can be enabled by setting a mode. By doing so, the image processing device according to the present embodiment can realize an advantage of preventing a waiting time for a processing speed due to a data transfer of the kernel from a DDR (Double Data Rate) to the image processing device, that is, preventing a decrease in processing speed.

Figure 7:
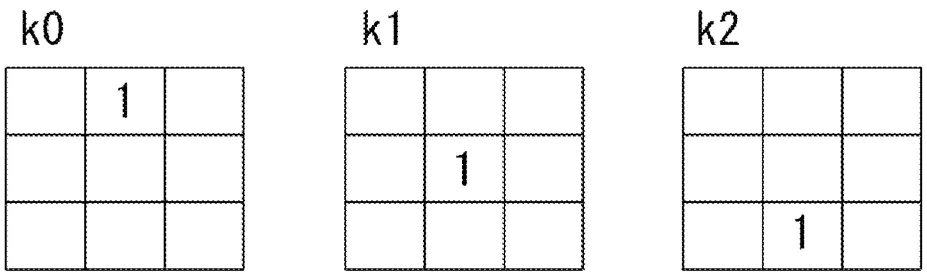
FIG. 7 is a diagram showing an example of a kernel pre-stored in an image processing device according to a second embodiment.
Figure 8:
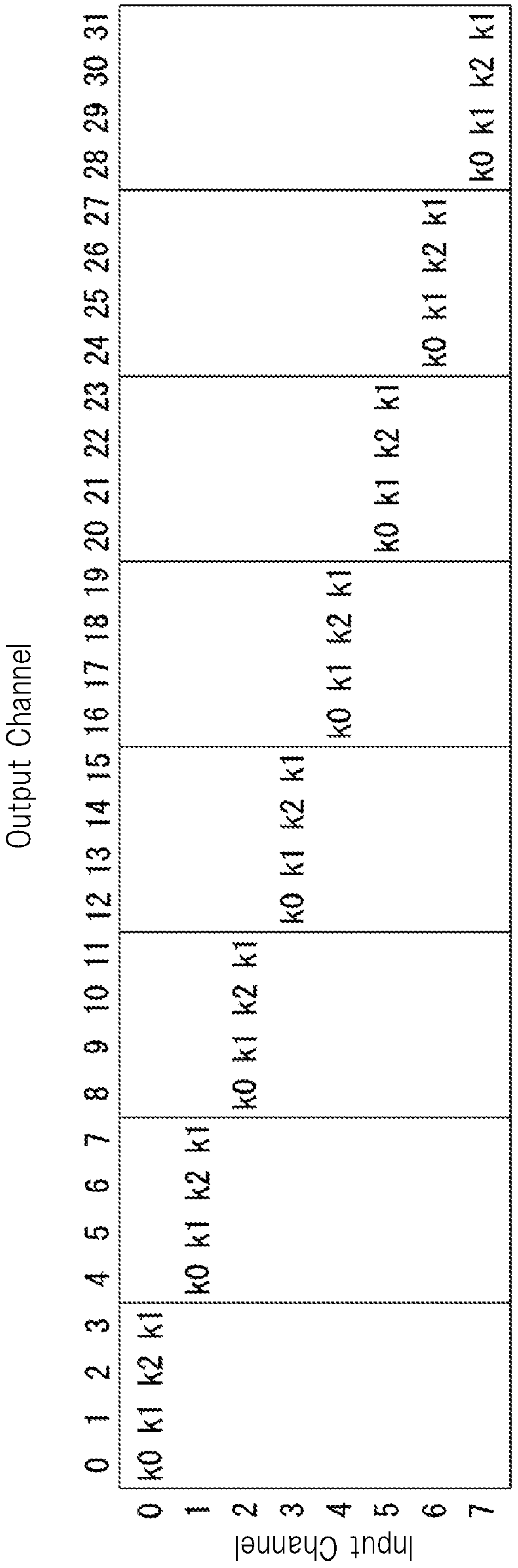
FIG. 8 is a diagram showing one example of allocation of kernels illustrated in FIG. 7.

FIG. 7 is a diagram showing an example of kernels k0, k1, k2 pre-stored in the registers in the image processing device according to the present embodiment. Further, FIG. 8 is a diagram showing an allocation example of the kernels k0, k1, k2 when the shift data generation circuit 13 generates 32-channel output data (shift data) from 8-channel input data. In an example of FIG. 8, a total of four kernels, that is, three kernels k0, k1, k2 and one dummy kernel k1 are allotted to one input channel. Therefore, the image processing device according to the present embodiment can generate four output channels with different shift amounts from the one input channel by using the four kernels. Incidentally, the same data as that of the kernel k1 is generated in the channel corresponding to the kernel k1 of the dummy, which seems redundant. However, by providing the kernel of the dummy, even if the subsequent filtering processing circuit 14 can obtain the maximum value in the channel direction only in units of four channels, there is an advantage in that data of a fourth second channel can be filled so that the calculation for obtaining the maximum value of three channels is not affected.

THIRD EMBODIMENT

Figure 9:
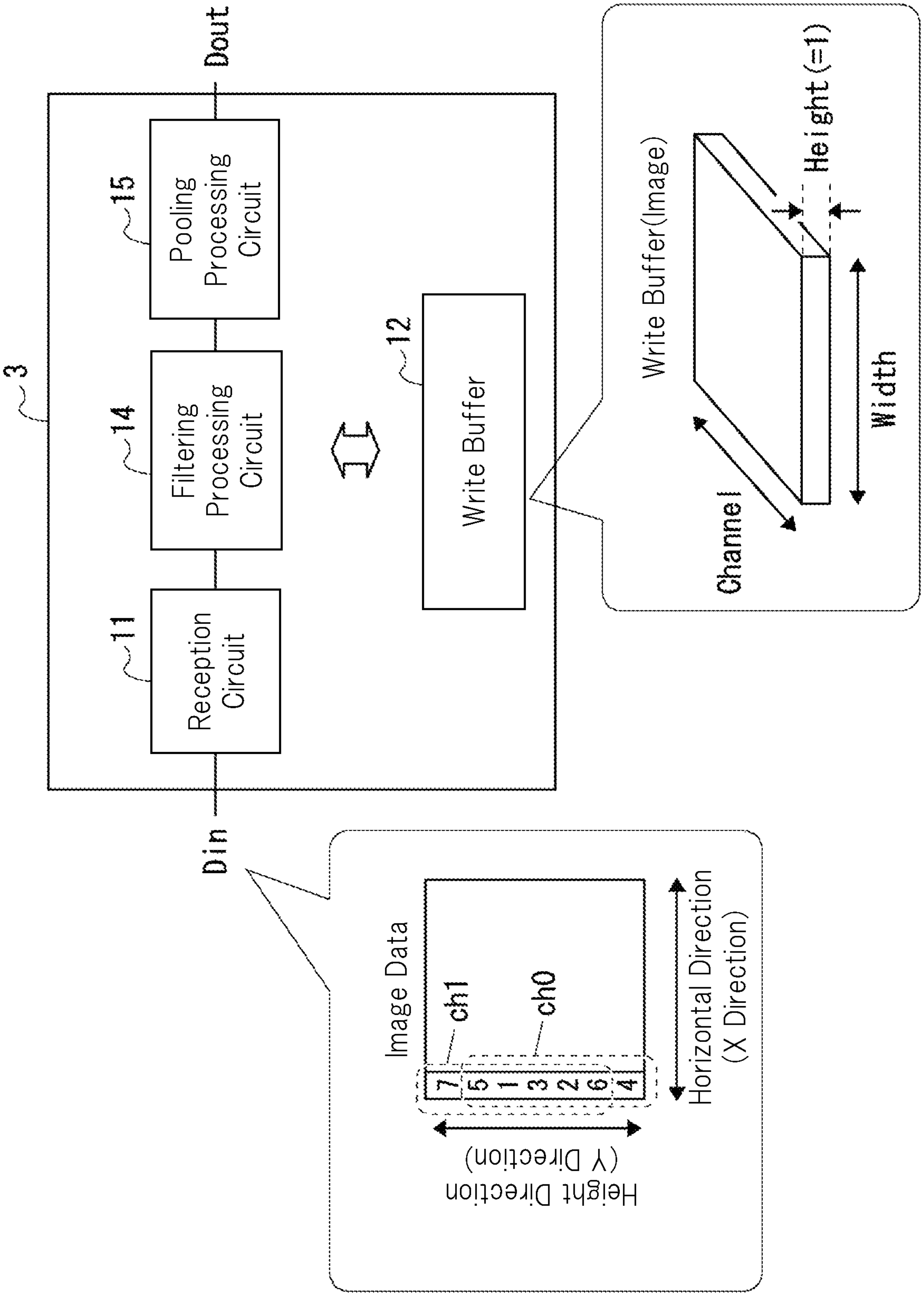
FIG. 9 is a block diagram showing a configuration example of an image processing device according to a third embodiment.
Figure 10:
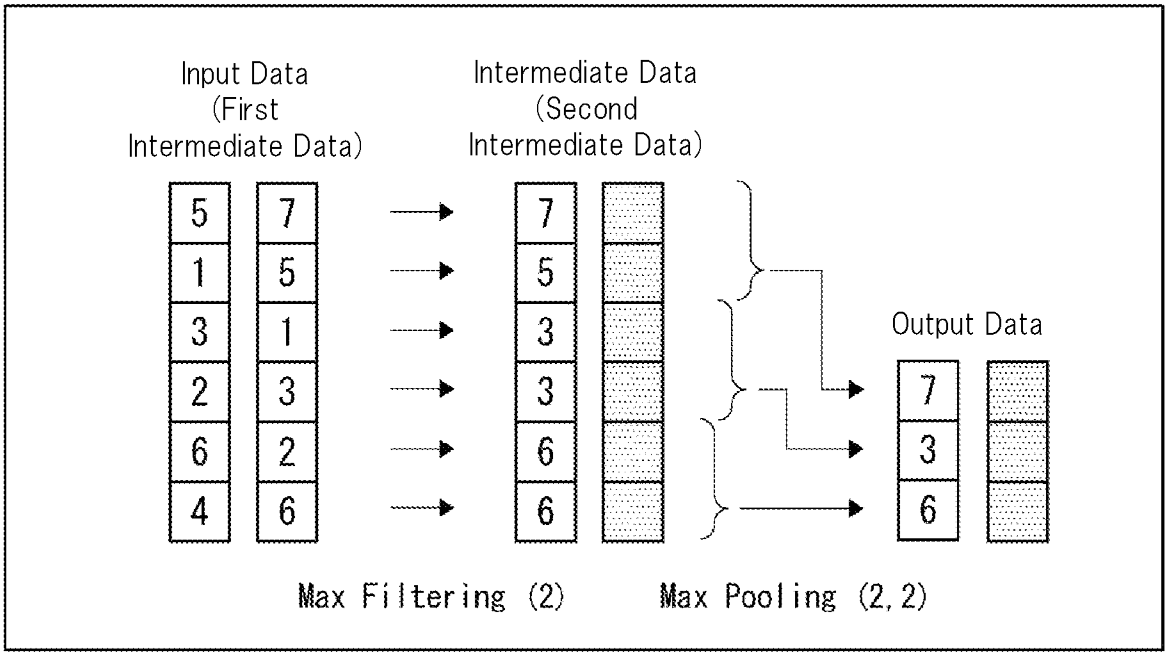
FIG. 10 is a diagram for explaining one example of an Overlap Pooling processing by an image processing device according to a third embodiment.

FIG. 9 is a block diagram showing a configuration example of an image processing device 3 according to a third embodiment. FIG. 10 is a diagram for explaining one example of an Overlap Pooling processing by the image processing device 3. A plurality of pieces of image data (shift data) corresponding to a plurality of pieces of shift data generated by the shift data generation circuit 13 are inputted as the image data Din to an image processing device 3. Therefore, the image processing device 3 does not need to have the shift data generation circuit 13 in comparison with the image processing device 1.

Specifically, the image processing device 3 includes a reception circuit 11, a write buffer 12, a filtering processing circuit 14, and a pooling processing circuit 15. The reception circuit 11 receives the plurality of pieces of shift data (first intermediate data) inputted from the outside of the image processing device 3. The plurality of pieces of shift data accepted by the reception circuit 11 are stored in a plurality of register groups mutually corresponding to the plurality of channels of write buffer 12, respectively. For example, the reception circuit 11 receives the plurality of pieces of shift data by reading one piece of image data from a plurality of different reading start positions. Other configurations and operations of the image processing device 3 are the same as those of the image processing device 1, so that a description thereof will be omitted.

The image processing device 3 according to the present embodiment can achieve effects almost similar to those of the image processing device 1. The present embodiment has explained an example in which the image processing device 3 does not include the shift data generation circuit 13, the present invention is not limited to this. For example, the image processing device 3 further includes the shift data generation circuit 13 as a circuit configuration of a CNN-IP, and may have a path going through the shift data generation circuit 13 (that is, a path via a convolution operator) and a path not going through (that is, a path that performs accumulation for cumulatively adding a calculation result for each channel). The advantage of the present embodiment is that the Overlap Pooling processing can be performed by using the path for performing the accumulation not going through the shift data generation circuit 13. For example, when the path performing the accumulation is larger in the number of processible channels than the path going through the shift data generation circuit 13 (Dout>>Din), the image processing device 3 according to the present embodiment has an advantage of enhancing the processing speed.

The invention made by the present inventor(s) has been specifically described above based on the embodiments, but the present invention is not limited to the embodiments already described and, needless to say, various modifications can be made without departing from the scope of the invention.

Further, the present disclosure can realize part or all of the image processing by causing the CPU (Central Processing Unit) to execute a computer program(s).

The program described above includes an instruction (or software code) that, when read into a computer, cause the computer to perform one or more functions described in the embodiments. The program may be stored in a non-transitory computer-readable medium or tangible storage medium. As not limitation but an example, the computer-readable medium or the tangible storage medium may include a random-access memory (RAM), a read-only memory (ROM), a flash memory, a solid-state drive (SSD), or other memory technology, a CD-ROM, a DVD (Digital Versatile Disc), a Blu-ray disc, or other optical disc storage, a magnetic cassette, a magnetic tape, a magnetic disc storage, or other magnetic storage device. The program may be transmitted on a transitory computer-readable medium or communication medium. By way of example, and not limitation, transitory computer readable media or communication media include electrical, optical, acoustic, or other forms of propagation signals.

What is claimed is:

1. An image processing device comprising:

a reception circuit receiving image data spread in a height direction and a horizontal direction;

a line memory having a plurality of channels, each channel having a register group configured to hold pixel data spread in the horizontal direction in units of row along the height direction;

a shift data generation circuit generating, for an entirety of the image data, a plurality of pieces of first intermediate data in which a spatial position of the image data is shifted by respective shift amounts that are different from one another in one or both of the height direction and the horizontal direction, the shift data generation circuit storing the plurality of pieces of first intermediate data in a plurality of register groups respectively corresponding to the plurality of channels of the line memory;

a filtering processing circuit extracting data, which indicates a maximum value among a plurality of pieces of data having a same spatial position and having different channels, from the plurality of pieces of first intermediate data stored in the line memory, the filtering processing circuit generating second intermediate data; and a pooling processing circuit extracting, from the second intermediate data, data indicating the maximum value among the plurality of pieces of data for each predetermined spatial region, and generating output data.

2. The image processing device according to claim 1, further comprising a convolution operation circuit, and wherein the convolution operation circuit is used for the shift data generation circuit.

3. The image processing device according to claim 2, wherein the shift data generation circuit uses a plurality of kernels, in which the spatial position of the image data is shifted by the respective shift amounts that are different from one another in one or both of the height direction and the horizontal direction, to generate the plurality of pieces of intermediate data from the plurality of pieces of image data.

4. The image processing device according to claim 3, wherein the plurality of kernels are stored in a predetermined register in advance.

5. The image processing device according to claim 1, further comprising a Cross Channel Operation circuit, and wherein the Cross Channel Operation circuit is used for the filtering processing circuit.

6. The image processing device according to claim 1, when a Max Pooling processing whose kernel size is K and whose stride is S is needed per direction with respect to the image data, wherein each of K and S is a positive integer, and wherein K is greater than S, wherein the shift data generation circuit generates K−S+1 pieces of first intermediate data per direction, and wherein the pooling processing circuit generates the output data by setting, as S, a size of the predetermined spatial region.

7. An image processing device comprising:

a line memory having a plurality of channels, each channel having a register group configured to hold data spread in a horizontal direction in units of row along a height direction;

a reception circuit receiving a plurality of pieces of first intermediate data in which a spatial position including the height direction of image data is shifted by respective shift amounts that are different from one another in one or both of the height direction and the horizontal direction, the reception circuit storing the plurality of pieces of first intermediate data in a plurality of register groups respectively corresponding to the plurality of channels of the line memory;

a filtering processing circuit extracting data, which indicates a maximum value among a plurality of data having a same spatial position and having different channels, from the plurality of pieces of first intermediate data stored in the line memory, the filtering processing circuit generating second intermediate data; and a pooling processing circuit extracting, from the second intermediate data, data indicating the maximum value among the plurality of pieces of data for each predetermined spatial region, and generating output data.

8. The image processing device according to claim 7, wherein the reception circuit is configured to further receive the image data spread in the height direction and in the horizontal direction, and wherein the image processing device further comprises a shift data generation circuit generating the plurality of pieces of first intermediate data in which a spatial position including the height direction of the image data received by the reception circuit is shifted in the height direction by the respective shift amounts that are different from one another, the shift data generation circuit storing the plurality of pieces of first intermediate data in the plurality of register groups respectively corresponding to the plurality of channels of the line memory.

9. An image processing method by an image processing device including a reception circuit receiving image data spread in a height direction and in a horizontal direction, a line memory having a plurality of channels, each channel having a register group configured to hold data spread in the horizontal direction in units of row along a height direction, a shift data generation circuit, a filtering processing circuit, and a pooling processing circuit, the image processing method comprising:

receiving the image data by the reception circuit;

generating a plurality of pieces of intermediate data in which a spatial position including the height direction of the image data is shifted by respective shift amounts that are different from one another in one or both of the height direction and the horizontal direction, by the shift data generation circuit;

storing the plurality of pieces of first intermediate data in a plurality of register groups mutually corresponding to a plurality of channels of the line memory, respectively;

extracting, by the filtering processing circuit, data indicating a maximum value among a plurality of pieces of data, which have a same spatial position and have a different channel, among the plurality of pieces of first intermediate data stored in the plurality of resister-register groups of the line memory, to generate second intermediate data; and extracting, by the pooling processing circuit, data indicating the maximum value among the plurality of pieces data for each predetermined spatial region, to generate output data.

10. The image processing method according to claim 9, further comprising generating the plurality of pieces of first intermediate data from the image data by a convolution operation circuit used as the shift data generation circuit.

11. The image processing method according to claim 10, further comprising generating the plurality of pieces of first intermediate data, by the convolution operation circuit, from the image data by using a plurality of kernels in which the spatial position of the image data is shifted by the respective shift amounts that are different from one another in one or both of the height direction and the horizontal direction.

12. The image processing method according to claim 11, further comprising generating the plurality of pieces of first intermediate data, by the convolution operation circuit, from the image data by using the plurality of kernels stored in a predetermined register in advance.

13. The image processing method according to claim 9, further comprising generating the second intermediate data from the plurality of pieces of first intermediate data by a Cross Channel Operation circuit used as the filtering processing circuit.

14. The image processing method according to claim 9, further comprising, when a Max Pooling processing whose kernel size is K and whose stride is S is required for the image data per direction, generating the K−S+1 pieces of first intermediate data per direction and the output data in which a size of the predetermined spatial region per direction is set as S, wherein each of K and S is a positive integer, and wherein K is greater than S.

* * * * *